US011811910B2

(12) United States Patent
Zhang et al.

(10) Patent No.: US 11,811,910 B2
(45) Date of Patent: Nov. 7, 2023

(54) BLOCKCHAIN MAINTENANCE METHOD AND APPARATUS, SERVER, AND COMPUTER-READABLE STORAGE MEDIUM

(71) Applicant: HUAWEI CLOUD COMPUTING TECHNOLOGIES CO., LTD., Gui'an New District (CN)

(72) Inventors: Yu Zhang, Beijing (CN); Lei Wang, Xi'an (CN); Lipeng Hao, Xi'an (CN); Ziyi Zhang, Beijing (CN)

(73) Assignee: HUAWEI CLOUD COMPUTING TECHNOLOGIES CO., LTD., Gui'an New District (CN)

( * ) Notice: Subject to any disclaimer, the term of this patent is extended or adjusted under 35 U.S.C. 154(b) by 214 days.

(21) Appl. No.: 17/166,860

(22) Filed: Feb. 3, 2021

(65) Prior Publication Data

US 2021/0160058 A1 May 27, 2021

Related U.S. Application Data

(63) Continuation of application No. PCT/CN2019/081212, filed on Apr. 3, 2019.

(30) Foreign Application Priority Data

Aug. 3, 2018 (CN) .......................... 201810877867.3

(51) Int. Cl.
*H04L 9/06* (2006.01)
*H04L 9/32* (2006.01)
*H04L 9/40* (2022.01)

(52) U.S. Cl.
CPC .......... *H04L 9/0637* (2013.01); *H04L 9/3263* (2013.01); *H04L 63/145* (2013.01)

(58) Field of Classification Search
CPC .... H04L 9/0637; H04L 9/3263; H04L 63/145
(Continued)

(56) References Cited

U.S. PATENT DOCUMENTS

2017/0039330 A1 2/2017 Tanner, Jr. et al.
2018/0101560 A1 4/2018 Christidis et al.
(Continued)

FOREIGN PATENT DOCUMENTS

CN 106452785 A 2/2017
CN 107040594 A 8/2017
(Continued)

OTHER PUBLICATIONS

Yuan et al., "Blockchain: The State of the Art and Future Trend," ACTA Automatica Sinica, vol. 42, No. 4, pp. 1-14, Elsevier Publishing, Amsterdam, Netherlands (Apr. 2016).

*Primary Examiner* — Bryan F Wright
(74) *Attorney, Agent, or Firm* — Leydig, Voit & Mayer, Ltd.

(57) ABSTRACT

This application discloses a method used to remove a target blockchain node group of a first tenant from a channel. In the method, an execution node of a second tenant receives configuration information of the target blockchain node group of the first tenant which is sent by a management node, obtains channel configuration information of the channel from a consensus organization, and generates channel adjustment information based on the channel configuration information and the configuration information of the target blockchain node group. The execution node of the second tenant sends the channel adjustment information to the consensus organization, and the consensus organization generates a block including the channel adjustment information. A blockchain node group of the second tenant obtains the (Continued)

block from the consensus organization, and adds the block to a blockchain stored in the second tenant.

20 Claims, 7 Drawing Sheets

(58) Field of Classification Search
USPC ............................................................ 713/175
See application file for complete search history.

(56) References Cited

U.S. PATENT DOCUMENTS

| | | | |
|---|---|---|---|
| 2019/0013948 A1* | 1/2019 | Mercuri | .................. G06F 16/27 |
| 2019/0036712 A1 | 1/2019 | Qiu | |
| 2019/0149418 A1* | 5/2019 | Bertsche | .................. G06F 9/445 |
| | | | 707/625 |
| 2019/0384627 A1* | 12/2019 | De Caro | .............. G06Q 20/223 |
| 2020/0151350 A1* | 5/2020 | Irazabal | .............. G06F 16/2308 |

FOREIGN PATENT DOCUMENTS

| | | |
|---|---|---|
| CN | 107171829 A | 9/2017 |
| CN | 107360001 A | 11/2017 |
| CN | 107464117 A | 12/2017 |
| CN | 108256864 A | 7/2018 |
| CN | 109033405 A | 12/2018 |
| EP | 3731494 A1 | 10/2020 |
| WO | 2018069566 A1 | 4/2018 |
| WO | 2018073482 A1 | 4/2018 |
| WO | 2018115567 A1 | 6/2018 |
| WO | 2018132108 A1 | 7/2018 |
| WO | 2019174048 A1 | 9/2019 |

* cited by examiner

BLOCKCHAIN MAINTENANCE METHOD AND APPARATUS, SERVER, AND COMPUTER-READABLE STORAGE MEDIUM

CROSS-REFERENCE TO RELATED APPLICATIONS

This application is a continuation of International Patent Application No. PCT/CN2019/081212, filed on Apr. 3, 2019, which claims priority to Chinese Patent Application No. 201810877867.3, filed on Aug. 3, 2018. The disclosures of the aforementioned applications are hereby incorporated by reference in their entireties.

TECHNICAL FIELD

This application relates to the computer technology field, and in particular, to a blockchain maintenance method and apparatus, a server, and a computer-readable storage medium.

BACKGROUND

A blockchain (or block chain) is a chain data structure jointly maintained by a plurality of peer blockchain nodes in a distributed database. The blockchain may be classified into a public blockchain, a consortium blockchain, and a private blockchain. The public blockchain is a blockchain that has no an access restriction. Therefore, anyone can read and send a transaction that can be effectively confirmed, and participate in a consensus process of the transaction. The private blockchain is a blockchain whose write permission is controlled by an organization. Only a member (which may be an individual or an organization) confirmed by the organization can write data to the blockchain. The consortium blockchain is a blockchain in which a plurality of organizations (hereinafter referred to as members of the consortium blockchain) jointly participate in management. Each member runs one or more nodes, and each node is referred to as a participant of the consortium blockchain. The consortium blockchain allows only nodes in the members to read and send transactions and jointly record transaction data.

The members of both the consortium blockchain and the private blockchain can write data only after obtaining permissions. Therefore, the consortium blockchain and the private blockchain are collectively referred to as a permission chain.

Currently, members of the permission chain are determined by management personnel when the consortium blockchain or the private blockchain is initialized. Deleting a new member requires the management personnel to replan or create a consortium blockchain or a private blockchain, and such implementation is complex.

SUMMARY

In view of this, this application provides a blockchain maintenance method and apparatus, and a server, to dynamically remove a blockchain node group of an old tenant (namely, a member) from blockchain maintenance.

According to a first aspect, this application provides a blockchain maintenance method. An application scenario of this method is as follows: a plurality of tenants each have at least one blockchain node group, and each tenant may add some or all of the blockchain node groups of the tenant to a channel. The plurality of tenants include a first tenant and a second tenant, and a target blockchain node group of the first tenant has joined the channel. The channel is used to maintain one blockchain. Specifically, each blockchain node group in the channel stores the blockchain, and participates in maintenance of the blockchain. A blockchain node group removed from the channel no longer updates a locally stored blockchain, and no longer participates in maintenance of the blockchain. The method is used to remove the target blockchain node group of the first tenant from the channel.

In this method, a management node instructs an execution node of the first tenant to stop running the target blockchain node group. Correspondingly, the execution node of the first tenant stops running the target blockchain node group in a resource isolation region of the first tenant. In this way, the target blockchain node group stops running in the channel, for example, obtaining a new block from a consensus organization.

The management node obtains configuration information of the target blockchain node group, and sends the configuration information of the target blockchain node group to an execution node of the second tenant.

The execution node of the second tenant obtains channel configuration information of the channel from the consensus organization, where the channel configuration information includes an identifier of the channel and configuration information of all blockchain node groups that have joined the channel, and all the blockchain node groups that have joined the channel include the target blockchain node group.

The execution node of the second tenant generates channel adjustment information of the channel based on the channel configuration information and the configuration information that is of the target blockchain node group and that is received from the management node. The channel adjustment information includes a difference between the channel configuration information and the configuration information of the target blockchain node group. To be specific, the channel adjustment information includes configuration information of a blockchain node group other than the target blockchain node group in all the blockchain node groups that have joined the channel. The channel adjustment information further includes the identifier of the channel.

The execution node of the second tenant sends the channel adjustment information to the consensus organization, and the consensus organization generates a block including the channel adjustment information.

A blockchain node group that is of the second tenant and that has joined the channel obtains the block including the channel adjustment information from the consensus organization, and adds the block to a blockchain stored in the blockchain node group.

In this application, the blockchain node group that is of the second tenant and that has joined the channel records the channel adjustment information in the blockchain, and the channel adjustment information records a channel configuration change when the target blockchain node group is removed from the channel. In addition, the channel adjustment information is recorded in the blockchain and indicates that the channel adjustment information is a consensus reached by another tenant in the channel on agreeing to remove the first tenant from the channel.

Similarly, for all tenants other than the first tenant, of the tenants that have joined the channel, and the blockchain node groups that have joined the channel, each tenant may obtain the channel adjustment information from a consensus node, and store the channel adjustment information in a blockchain maintained by each blockchain node group

[LB1][1 z2]. In this way, for all the tenants other than the first tenant, of the tenants that have joined the channel, the blockchain node groups that have joined the channel, of the all the tenants each record, in the blockchain maintained by the blockchain node group, the consensus on agreeing to exit the first tenant from the channel.

In a possible design of the first aspect, the target blockchain node group of the first tenant is a blockchain node group that is of the first tenant and that has joined the channel. Correspondingly, that the target blockchain node group of the first tenant exits the channel means that each blockchain node group that is of the first tenant and that has joined the channel exits the channel. In this way, the first tenant may be removed from participating in maintenance of the channel.

In a possible design of the first aspect, the configuration information of the target blockchain node group includes an operation permission of the target blockchain node group, a permission certificate of the target blockchain node group, and a security algorithm used by the target blockchain node group.

The operation permission of the target blockchain node group is used to configure, for the target blockchain node group, a permission (e.g., a read permission/a write permission/a highest permission) to operate data in the blockchain node group.

The permission certificate of the target blockchain node group includes a certificate for managing a highest management permission of the target blockchain node group, a root certificate of the target blockchain node group, and a root certificate used for communication of the target blockchain node group. The target blockchain node group can be operated/accessed only using these permission certificates.

The security algorithm used by the target blockchain node group includes an algorithm (e.g., a Hash algorithm) for preventing a block from being tampered with. In this way, a transaction record in the block may be prevented from being maliciously modified.

The security algorithm used by the target blockchain node group may further include an algorithm (e.g., the Hash algorithm) for preventing tampering with a transaction record endorsed by a blockchain node group. A transaction record processed by using the algorithm is sent to the consensus node, to prevent transaction information in the transaction record from being leaked on the consensus node.

In a possible design of the first aspect, the channel adjustment information further includes a permission policy of the channel. The permission policy of the channel specifies a tenant who has a management permission in the channel. Subsequently, the tenant who has the management permission may read/write the channel configuration information, and the tenant may further invite another tenant to join the channel.

In a possible design of the first aspect, the channel adjustment information further includes a version number of the channel adjustment information and a version number of the channel configuration information.

In a possible design of the first aspect, for a contract matter that requires the blockchain node group of the second tenant and the target blockchain node group of the first tenant to participate in endorsement, the execution node of the second tenant updates, in a chaincode used to execute the contract matter, an endorsement policy corresponding to the contract matter. An updated endorsement policy specifies that the target blockchain node group does not participate in endorsement of a transaction record obtained by executing the contract matter.

Similarly, if a blockchain node group of another tenant has a contract matter that requires to jointly participate in endorsement with the target blockchain node group of the first tenant, an execution node of the other tenant updates, in a chaincode used to execute the contract matter, an endorsement policy corresponding to the contract matter. An updated endorsement policy specifies that the target blockchain node group does not participate in endorsement of a transaction record obtained by executing the contract matter.

In a possible design of the first aspect, the management node sends, to a tenant other than the first tenant in all the tenants that have joined the channel, a request for removing the first tenant from the channel. The management node receives feedback, on the request, of the tenant other than the first tenant in all the tenants that have joined the channel, and reaches, according to a consensus policy, a consensus on removing the first tenant from the channel for all feedback. In this way, the management node organizes the tenants other than the first tenant in all the tenants that have joined the channel into reaching the consensus on removing the first tenant from the channel.

In a possible design of the first aspect, when a virus exists in the resource isolation region of the first tenant, the management node generates the request for removing the first tenant from the channel. In this way, impact on blockchain maintenance is avoided when the target blockchain node group of the first tenant is infected with the virus.

According to a second aspect, this application provides a blockchain maintenance apparatus, including a plurality of functional units. The plurality of functional units are deployed in an execution node of a first tenant, so that the execution node of the first tenant performs the steps performed by the execution node of the first tenant in the blockchain maintenance method provided in any one of the first aspect or the possible designs of the first aspect.

This application provides another blockchain maintenance apparatus, including a plurality of functional units. The plurality of functional units are deployed in an execution node of a second tenant, so that the execution node of the second tenant performs the steps performed by the execution node of the second tenant in the blockchain maintenance method provided in any one of the first aspect or the possible designs of the first aspect.

This application further provides still another blockchain maintenance apparatus, including a plurality of functional units. The plurality of functional units are deployed in a management node, so that the management node performs the steps performed by the management node in the blockchain maintenance method provided in any one of the first aspect or the possible designs of the first aspect.

According to a third aspect, this application provides a server. The server includes a processor and a memory. The memory stores a computer instruction. The processor executes the computer instruction stored in the memory, so that the server performs the steps performed by an execution node of a first tenant in the blockchain maintenance method provided in any one of the first aspect or the possible designs of the first aspect, performs the steps performed by an execution node of a second tenant in the blockchain maintenance method provided in any one of the first aspect or the possible designs of the first aspect, or performs the steps performed by a management node in the blockchain maintenance method provided in any one of the first aspect or the possible designs of the first aspect.

In a possible design of the third aspect, the computer instruction stored in the memory is used to implement a functional unit in any blockchain maintenance apparatus provided in the second aspect.

According to a fourth aspect, a computer-readable storage medium is provided. The computer-readable storage medium stores a computer instruction. When a processor of a server executes the computer instruction, the server performs the steps performed by an execution node of a first tenant in the blockchain maintenance method provided in any one of the first aspect or the possible designs of the first aspect, performs the steps performed by an execution node of a second tenant in the blockchain maintenance method provided in any one of the first aspect or the possible designs of the first aspect, or performs the steps performed by a management node in the blockchain maintenance method provided in any one of the first aspect or the possible designs of the first aspect.

In a possible design of the fourth aspect, the computer instruction stored in the computer-readable storage medium is used to implement a functional unit in any blockchain maintenance apparatus provided in the second aspect.

According to a fifth aspect, a computer program product is provided. The computer program product includes a computer instruction, and the computer instruction is stored in a computer-readable storage medium. A processor of a server may read the computer instruction from the computer-readable storage medium and execute the computer instruction, so that the server performs the steps performed by an execution node of a first tenant in the blockchain maintenance method provided in any one of the first aspect or the possible designs of the first aspect, performs the steps performed by an execution node of a second tenant in the blockchain maintenance method provided in any one of the first aspect or the possible designs of the first aspect, or performs the steps performed by a management node in the blockchain maintenance method provided in any one of the first aspect or the possible designs of the first aspect.

In a possible design of the fifth aspect, the computer instruction in the computer program product is used to implement a functional unit in any blockchain maintenance apparatus provided in the second aspect.

DESCRIPTION OF EMBODIMENTS

Figure 1:
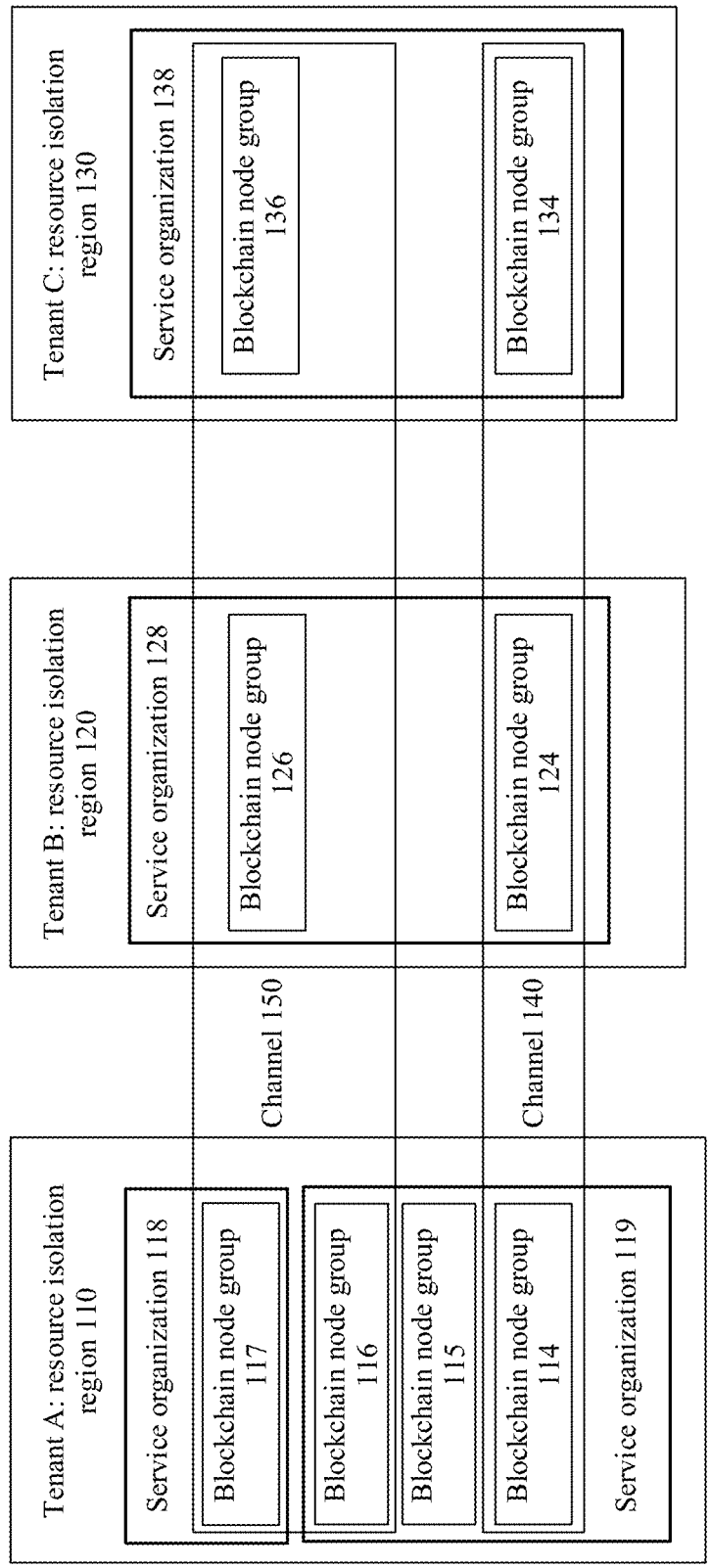
FIG. 1 is a schematic diagram of a channel according to this application.

The following describes technical solutions provided in this application with reference to accompanying drawings in this application.

Terms

A contract is used to record one or more contract matters. Each contract matter stipulates a plurality of participants and a transaction jointly completed by the plurality of participants. For example, a customer transfers money between two banks. The two banks serve as two participants to jointly complete a transfer transaction.

A transaction is any activity or event that can be recorded, for example, a medical event, identity management, document proof, food source tracing, transfer payment, or voting. In this application, when each transaction occurs, a transaction record corresponding to the transaction is generated.

A blockchain may be a chain data structure jointly maintained by a plurality of peer blockchain nodes in a distributed database. Each blockchain stores all transaction records of one or more contracts.

A block is a data unit in a blockchain. Each block records one or more endorsed transaction records. A blockchain is obtained by concatenating a plurality of blocks according to an occurrence sequence. Optionally, each block in the blockchain may usually include a Hash value, a timestamp, and a transaction record of a previous block.

A blockchain node is a peer node participating in maintenance of a blockchain. Each blockchain node stores all transaction records of the blockchain.

A member is a manager of a blockchain node, that is, an individual or an organization participating in blockchain management. The member may also be referred to as a user or a tenant, and is collectively referred to as the tenant in the following. Each tenant has independent resources (e.g., a computing resource and a storage resource). All transaction records in one blockchain are stored on a blockchain node of each tenant in the blockchain.

Resource isolation region: When participating in a blockchain, each tenant needs to apply for a specific quantity of resources (including a network resource, a computing resource, a storage resource, and the like) to deploy a blockchain node, where the resources may be leased or self-owned. In this application, resources allocated to each tenant are separately allocated to one resource isolation region. Resource isolation regions of a plurality of tenants are isolated from each other. A tenant cannot access another tenant across resource isolation regions unless otherwise configured.

Service organization: When a tenant provides a service, the tenant may also be referred to as a service organization. Optionally, when the tenant is an organization, and different departments of the tenant provide different services, each department of the tenant may also be referred to as a service organization. To be specific, in this application, one tenant may encompass one or more service organizations, and each service organization provides at least one type of service.

A blockchain node group is a structure participating in blockchain management in this application. Each service organization provides one or more blockchain node groups, and each blockchain node group may participate in maintenance of one blockchain.

A channel is a dedicated "subnet" used for communication between two or more tenants to implement a private and confidential transaction and establish a cross-tenant blockchain. In this application, the channel (one-to-one) corresponds to a blockchain. The channel may be defined by a plurality of members, an anchor peer of each member, a shared ledger (which may also be referred to as a blockchain), a chaincode, and an ordering service node (which may also be referred to as a consensus node).

Consensus: A blockchain is a distributed (e.g., decentralized) system whose history can be traced, that cannot be tampered with, and that is used to resolve a multi-party mutual trust issue. The distributed system is bound to face a consistency problem, and a process of resolving the consistency problem is referred to as consensus.

Consensus node: Currently, consensus is implemented by using a consensus algorithm. A node that executes the consensus algorithm is referred to as a consensus node.

A consensus organization includes all consensus nodes and is used to reach a consensus on and sort transaction records.

FIG. 1 is a schematic diagram of a channel according to an embodiment of this application. In this application, a resource isolation region 110, a resource isolation region 120, and a resource isolation region 130 are respectively allocated to a plurality of tenants (e.g., a tenant A, a tenant B, and a tenant C as shown in FIG. 1). Generally, resources in the resource isolation region 110, the resource isolation region 120, and the resource isolation region 130 are isolated from each other. Resources in one resource isolation region may be allocated by a public cloud, or may be obtained from a private data center of a corresponding tenant. When the resources in the resource isolation region are allocated by the public cloud, the resource isolation region may be configured as a virtual private cloud (VPC), and resources of different tenants are isolated by using different VPCs. When the resources in the resource isolation region are obtained from the private data center of the corresponding tenant, the resources of different tenants are isolated by using the data center.

Further, the tenant A includes a service organization 118 and a service organization 119. The tenant B includes a service organization 128, and the tenant C includes a service organization 138. Each service organization deploys at least one blockchain node group based on a service requirement, and each blockchain node group provides or participates in at least one type of service. For example, the service organization 118 deploys a blockchain node group 117. The service organization 119 deploys a blockchain node group 116, a blockchain node group 115, and a blockchain node group 114. The service organization 128 deploys a blockchain node group 124 and a blockchain node group 126. The service organization 138 deploys a blockchain node group 134 and a blockchain node group 136.

In this application, a service organization in each resource isolation region joins a channel at a granularity of a blockchain node group, and access between tenants is implemented via the channel, thereby implementing data transmission between different tenants. To be specific, if different blockchain node groups of a plurality of tenants join a same channel, all blockchain node groups in the channel may communicate with each other. For example, in FIG. 1, the blockchain node group 117, the blockchain node group 116, the blockchain node group 126, and the blockchain node group 136 all join a channel 150. In this case, the blockchain node group 117, the blockchain node group 116, the blockchain node group 126, and the blockchain node group 136 may communicate with each other in the channel 150. For another example, in FIG. 1, the blockchain node group 114, the blockchain node group 124, and the blockchain node group 134 all join a channel 140. In this case, the blockchain node group 114, the blockchain node group 124, and the blockchain node group 134 may communicate with each other in the channel 140. Blockchain node groups that are of different tenants and that do not join a same channel cannot communicate with each other. All blockchain node groups in a same channel can manage a same blockchain and view a same transaction record. Whether different blockchain node groups of a same tenant may communicate with each other is configured by the tenant, and is not discussed in this application.

In this application, blockchain node groups of different service organizations of different tenants may join a same channel.

Based on a service requirement, blockchain node groups of different service organizations of a same tenant in this application may join a same channel. For example, the tenant A is a bank, the blockchain node group 117 is deployed in an investment management department (the service organization 118) of the tenant A, and the blockchain node group 116 is deployed in an audit supervision department (the service organization 119) of the tenant A. In this case, both the blockchain node group 117 and the blockchain node group 116 join the channel 150 (a ledger channel, corresponding to a ledger blockchain). Therefore, both the investment management department and the audit supervision department participate in maintenance of the ledger blockchain. The investment management department can write an investment history into the blockchain, and the audit supervision department can verify whether the investment history is legitimate. This increases transaction security.

Certainly, the tenant may alternatively set a blockchain node group of a service organization not to join any channel, but to process only a service of the tenant. For example, the blockchain node group 115 of the tenant A does not join any channel.

In this application, the service organization is used to understand content of this application, and is not an entity participating in blockchain management. Therefore, it may be understood that the service organization is not an essential feature of this application.

Figure 2:
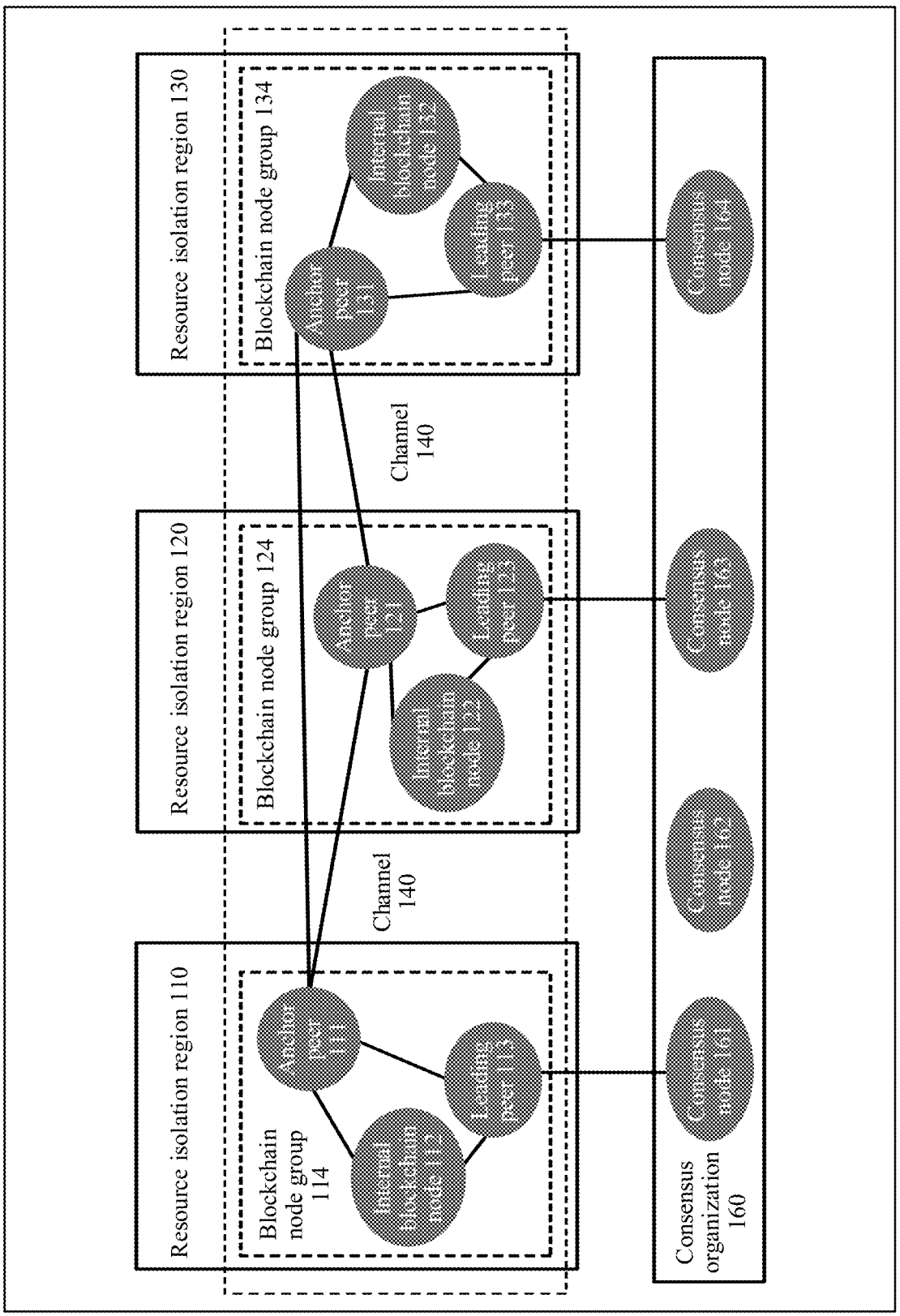
FIG. 2 is a schematic diagram of a blockchain system according to this application.

The following describes a possible blockchain system architecture by using an example. As shown in FIG. 2, the blockchain system includes a consensus organization 160 and three blockchain node groups 114, 124, and 134. The three blockchain node groups 114, 124, and 134 simultaneously join a channel 140. As shown in FIG. 2, the blockchain node groups (114, 124, and 134) are respectively deployed in different resource isolation regions.

Each blockchain node group includes three types of blockchain nodes: an anchor peer, an internal blockchain node, and a leading peer. The anchor peer is configured to communicate with another blockchain node group in a same channel. The internal blockchain node is configured to store a transaction record. The leading peer is configured to communicate with a consensus node corresponding to the blockchain node group. The anchor peer and the leading peer may be further configured to store a transaction record. Using FIG. 2 as an example, the blockchain node group 114 in a resource isolation region 110 includes an anchor peer 111, an internal blockchain node 112, and a leading peer 113; the blockchain node group 124 in a resource isolation region 120 includes an anchor peer 121, an internal blockchain node 122, and a leading peer 123; and the blockchain node group 134 in a resource isolation region 130 includes an anchor peer 131, an internal blockchain node 132, and a leading peer 133.

Optionally, three types of blockchain nodes in one blockchain node group may be deployed on a same physical device, or may be deployed on different physical devices. In another implementation, a same blockchain node may alternatively undertake two or more functions. The blockchain node group 114 in FIG. 2 is used as an example. Any combination of the anchor peer 111, the internal blockchain node 112, and the leading peer 113 may be deployed on a same physical or logical blockchain node. For example, the anchor peer 111, the internal blockchain node 112, and the leading peer 113 are deployed on a same blockchain node A. In this case, the blockchain node A may communicate with another blockchain node group, can store a transaction record, and can further communicate with a consensus node corresponding to the blockchain node group 114.

That an anchor peer communicates with another blockchain node group in a same channel specifically means that the anchor peer communicates with an anchor peer in the other blockchain node group in the same channel. Using FIG. 2 as an example, the anchor peer 111 may communicate with the anchor peer 121, so that the blockchain node group 114 may communicate with the blockchain node group 124 in the channel 140 by using the anchor peer 111. Optionally, peer to peer (P2P) communication is established between anchor peers in a same channel based on a gossip protocol.

When a leading peer in a blockchain node group communicates with a consensus node corresponding to the blockchain node group, the leading peer may obtain a to-be-verified new block from the consensus node. In a same channel, leading peers in different blockchain node groups may be communicatively connected to a same consensus node, or may be respectively connected to different consensus nodes. Using FIG. 2 as an example, the leading peer 113 is connected to a consensus node 161, the leading peer 123 is connected to a consensus node 163, and the leading peer 133 is connected to a consensus node 164.

The consensus organization 160 includes all consensus nodes. Each consensus node may receive an endorsed transaction record, and then process the transaction record based on a consensus algorithm with another consensus node in the consensus organization 160, to generate a consensus result for the transaction record. The consensus organization 160 may simultaneously serve a plurality of channels, to be specific, separately process transaction records in the plurality of channels based on the consensus algorithm.

After verifying a transaction record, a consensus node in the consensus organization 160 may generate a block for one or more transaction records in a same channel. Consensus nodes of the consensus organization 160 may synchronize the block. For example, the consensus node 161 generates a block, and sends copies of the block to a consensus node 162, the consensus node 163, and the consensus node 164. The consensus node 162, the consensus node 163, and the consensus node 164 respectively store the copies received by the consensus node 162, the consensus node 163, and the consensus node 164.

Optionally, the consensus organization 160 is deployed in a public cloud. For example, all the consensus nodes included in the consensus organization 160 are deployed in one resource isolation region in the public cloud.

Each blockchain node group in a channel corresponding to one blockchain stores a blockchain, and is responsible for updating a blockchain stored in the blockchain node group. Using FIG. 2 as an example, the blockchain node group 114, the blockchain node group 124, and the blockchain node group 134 each store one blockchain. The blockchain stored in each of the blockchain node group 114, the blockchain node group 124, and the blockchain node group 134 includes a block generated by executing a same contract. After a consensus node generates a new block, the three blockchain node groups 114, 124, and 134 each obtain the new block from the three consensus nodes 161, 163, and 164 respectively connected to the three blockchain node groups 114, 124, and 134, and add the new block to the blockchain stored in each of the blockchain node groups 114, 124, and 134. Therefore, if a blockchain stored on a blockchain node group is not maliciously modified, blockchains respectively stored in all blockchain node groups in a same channel are the same. If blockchains stored in a few blockchain node groups in a same channel are maliciously modified, the blockchains may be identified according to a rule that the minority subordinate to the majority. For example, if the blockchain node group 114 finds, by using the anchor peer 111, that a blockchain stored in the blockchain node group 124 is different from a blockchain stored in the blockchain node group 114, the three blockchain node groups 114, 124, and 134 mutually check respective blockchains. If the blockchain stored in the blockchain node group 124 is different from those stored in the blockchain node group 114 and the blockchain node group 134, it is considered that the blockchain stored in the blockchain node group 124 is abnormal. In this way, all blockchain node groups in a same channel participate in maintenance of one blockchain.

Figure 3:
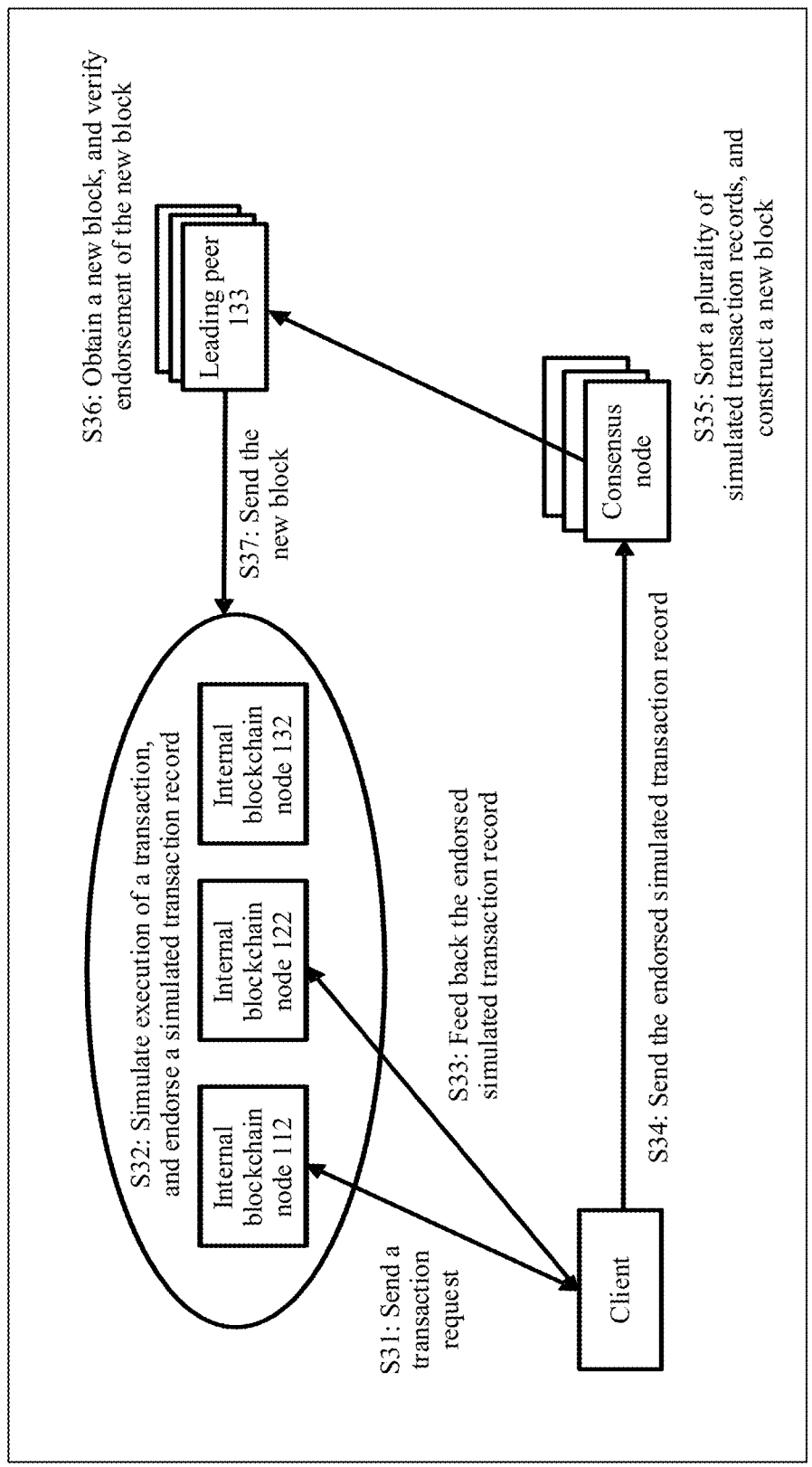
FIG. 3 is a schematic flowchart of a procedure of generating a new block according to this application.

The following describes, with reference to FIG. 3, a procedure of generating a new block according to an embodiment of this application. The procedure includes step S31, step S32, step S33, step S34, step S35, step S36 and step S37.

Step S31: A client sends a transaction request to each of an internal blockchain node 112 and an internal blockchain node 122.

The transaction request carries an identifier of a channel 140.

The client may access a blockchain node group in the channel 140. Optionally, a management platform delivers, to the client, a permission certificate that can be used to access the blockchain node group in the channel 140. In this way, the client may access the blockchain node group in the channel 140 by using the permission certificate.

If participants participating in a current contract matter include the blockchain node group 114 and the blockchain node group 124, the transaction request sent by the client to the internal blockchain node 112 carries a permission certificate used to access the blockchain node group 114, and the transaction request sent by the client to the internal blockchain node 122 carries a permission certificate used to access the blockchain node group 124.

Step S32: The internal blockchain node 112 and the internal blockchain node 122 each simulate execution of a transaction specified in the transaction request, generate a simulated transaction record, and endorse the simulated transaction record.

Specifically, the internal blockchain node 112 and the internal blockchain node 122 each deploy a chaincode corresponding to the transaction, and the internal blockchain node 112 and the internal blockchain node 122 each may execute the chaincode to implement a real transaction. However, in step S32, the internal blockchain node 112 and the internal blockchain node 122 do not actually execute the real transaction in the chaincode, but simulate execution of the transaction and generate the simulated transaction record. The simulated transaction record includes an execution result of executing the transaction.

The chaincode may specify an endorsement policy used for endorsement of the simulated transaction record of the transaction. The endorsement policy specifies an endorsement organization that participates in endorsement of the simulated transaction record, and the endorsement organization specified in the endorsement policy includes the blockchain node group 114 and the blockchain node group 124. The chaincodes stored in the blockchain node group 114 and the blockchain node group 124 each include the endorsement policy, and the internal blockchain node 112 and the internal blockchain node 122 each endorse the simulated transaction record based on the endorsement policy.

The internal blockchain node 112 and the internal blockchain node 122 each send an endorsed simulated transaction record to the client.

Step S33: The client receives the endorsed simulated transaction records respectively fed back by the internal blockchain node 112 and the internal blockchain node 122.

The client separately receives the endorsed simulated transaction records fed back by the internal blockchain node 112 and the internal blockchain node 122. If only a feedback from one of the internal blockchain node 112 and the internal blockchain node 122 is received, the client waits for a feedback from the other blockchain node. After receiving the simulated transaction records respectively fed back by the internal blockchain node 112 and the internal blockchain node 122, the client combines the simulated transaction records respectively fed back by the internal blockchain node 112 and the internal blockchain node 122 into one simulated transaction record. Therefore, the combined simulated transaction record includes endorsement of the internal blockchain node 112 and endorsement of the internal blockchain node 122. Subsequently, the client sends the combined simulated transaction record to a consensus node.

Step S34: The client sends the endorsed simulated transaction record to a consensus node of a consensus organization 160.

For a single transaction, after a plurality of endorsed simulated transaction records are combined into one simulated transaction record, the client sends the combined simulated transaction record to the consensus node.

For a plurality of transactions in the channel 140, the client sends a simulated transaction record of each transaction to the consensus node.

Step S35: The consensus node receives the simulated transaction records sent by the client, sorts the received plurality of simulated transaction records of the plurality of transactions, constructs a new block based on the plurality of sorted simulated transaction records, and synchronizes the new block with another consensus node.

The consensus node continuously receives transaction records of the channel 140; for example, the consensus node receives a plurality of simulated transaction records sent by one client or different clients at different time points. Each time the consensus node receives one simulated transaction record, the consensus organization verifies the simulated transaction record based on a consensus algorithm, and stores, on the consensus node, the verified simulated transaction record. The consensus node sorts all the stored simulated transaction records of the channel 140. For example, the consensus node sorts the plurality of simulated transaction records based on a time at which each simulated transaction record is received.

Optionally, when the plurality of sorted simulated transaction records of the channel 140 reach a preset data amount, the consensus node constructs a new block including the plurality of sorted simulated transaction records, where the new block belongs to the channel 140.

The consensus node in the consensus organization 160 synchronizes the new block. To be specific, the consensus node that generates the new block sends a copy of the new block to another consensus node in the consensus organization 160, and the another consensus node stores the copy of the new block.

Step S36: A leading peer in each blockchain node group obtains the new block from a consensus node connected to the leading peer, and verifies endorsement of the new block.

In an implementation, a leading peer 133 in a blockchain node group 134 obtains the new block from a consensus node 164 connected to the leading peer 133, and verifies whether endorsement of the new block complies with an endorsement policy. A leading peer 113 in the blockchain node group 114 obtains the new block from a consensus node 161 connected to the leading peer 113, and verifies whether endorsement of the new block complies with the endorsement policy.

Step S37: The leading peer in each blockchain node group sends the new block to an internal blockchain node in the blockchain node group after the new block passes endorsement verification.

In this way, the internal blockchain node adds the new block to a blockchain stored in the blockchain node group, and the simulated transaction record in the new block is converted into a real transaction record. In addition, a blockchain node that participates in endorsement executes a transaction recorded in the real transaction record in the new block.

For example, the leading peer 133 in the blockchain node group 134 sends the new block to an internal blockchain node 132, and the internal blockchain node 132 adds the new block to a blockchain stored in the blockchain node group 134. The leading peer 113 in the blockchain node group 114 sends the new block to the internal blockchain node 112. The internal blockchain node 112 not only adds the new block to the blockchain stored in the blockchain node group 114, but also performs some actions performed by the internal blockchain node 112 in the transaction recorded in the transaction record in the new block. For example, if the transaction is cross-bank transfer, the internal blockchain node 112 is a transferor, and the internal blockchain node 122 is a payee, the internal blockchain node 112 performs a transfer operation.

It is assumed that when the channel 140 is created, blockchain node groups of a plurality of tenants join the channel. The plurality of tenants include a tenant A, a tenant B, and a tenant C. To be specific, the blockchain node group 114 of the tenant A, the blockchain node group 124 of the tenant B, and the blockchain node group 134 of the tenant C all have joined the channel 140. After the channel 140 is created, according to the method provided in this application, the blockchain node group 124 of the tenant B may exit the channel 140, so that the blockchain node group 124 of the tenant B is removed from maintenance of a blockchain corresponding to the channel 140. As used herein, a blockchain node group can be described as "exiting" a channel, which results in the blockchain node group being removed from a set of blockchain node groups participating in the maintenance of the blockchain.

Figure 4:
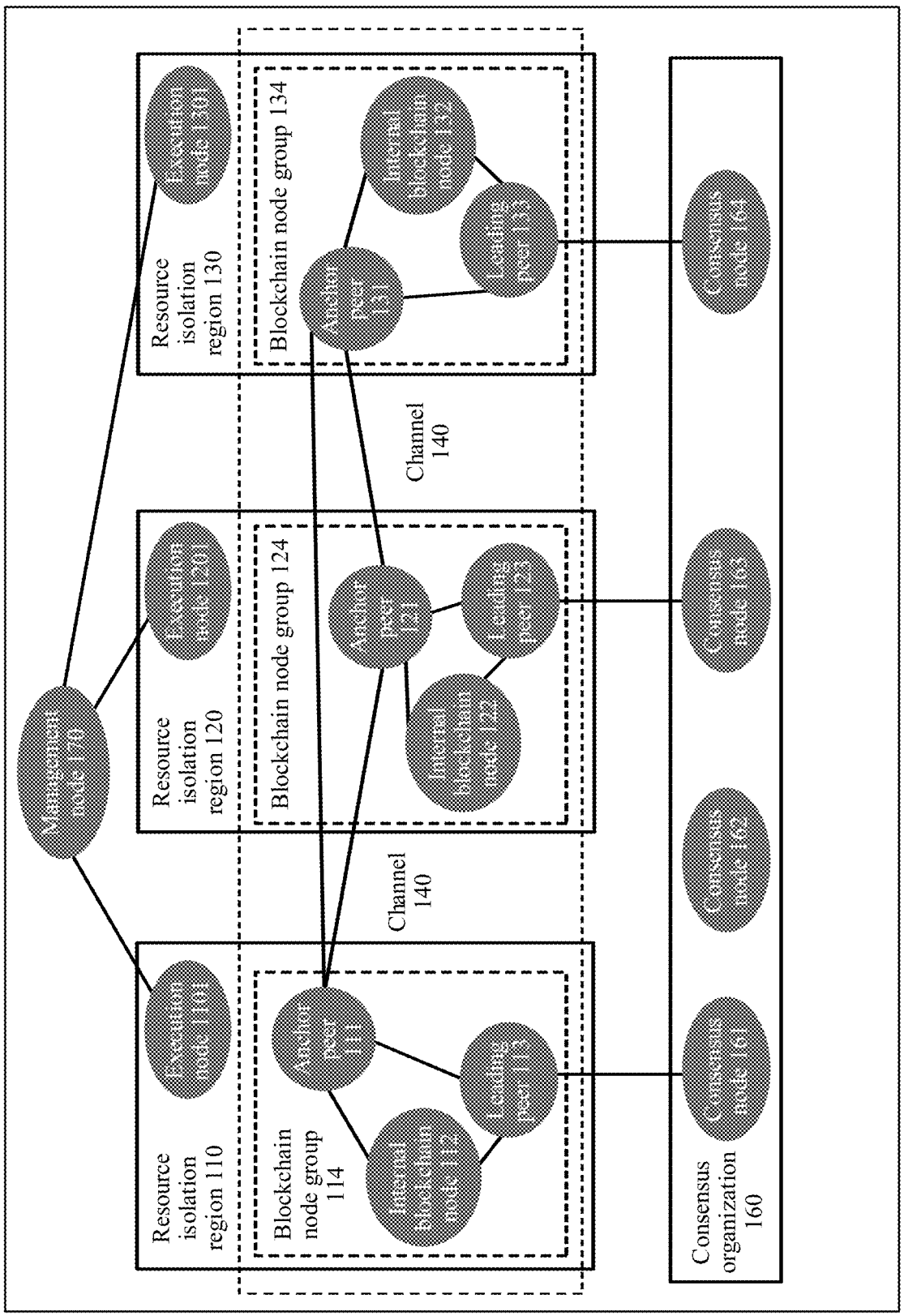
FIG. 4 is another schematic diagram of a blockchain system according to this application.

FIG. 4 provides a possible implementation architecture for removing the blockchain node group of the tenant B from the channel 140. As shown in FIG. 4, based on the blockchain system shown in FIG. 2, the architecture further includes a management node 170, configured to manage execution nodes of all tenants. An execution node of a tenant is configured to perform an operation in a resource isolation region of the tenant according to an indication of the management node 170 to, for example, deploy a blockchain node group. The execution node is deployed in the resource isolation region of the tenant. For example, an execution node 1101 of a tenant A is deployed in a resource isolation region 110 of the tenant A.

The management node 170 may be deployed on a management platform. The management platform may be deployed on one server, or may be deployed on a plurality of servers in a distributed manner. The server in this application may be a server in a public cloud, or may be a server in a private cloud. The management node 170 may manage all channels (e.g., a channel 140). The management node 170 is communicatively connected to the execution nodes (e.g., the execution node 1101, an execution node 1201, and an execution node 1301) of all the tenants, so that the management node 170 may manage a blockchain node group of each tenant by using an execution node of the tenant.

Figure 5:
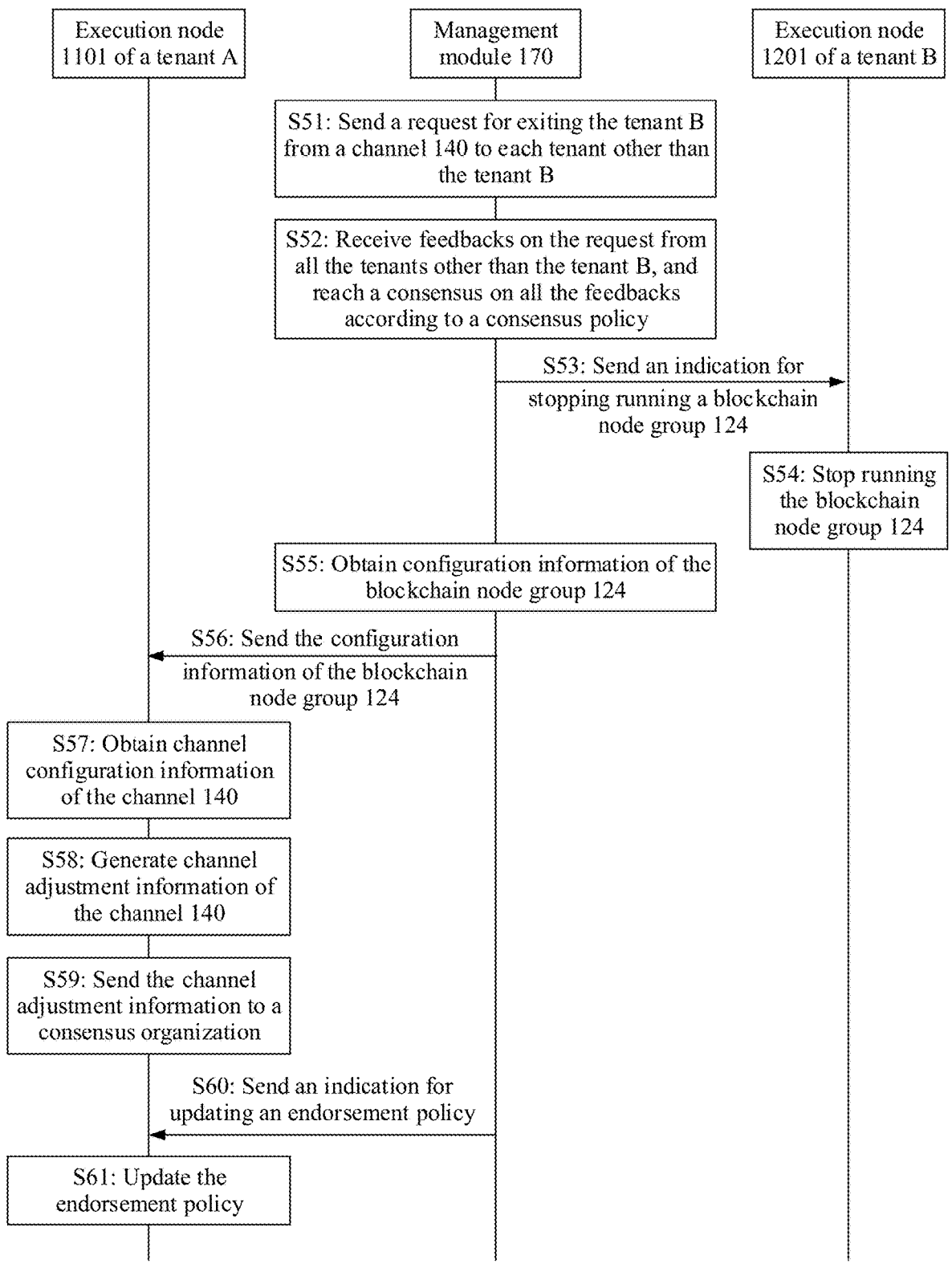
FIG. 5 is a schematic flowchart of a blockchain maintenance method according to this application.

The following describes a blockchain maintenance method provided in this application with reference to FIG. 5. The method is used to remove a blockchain node group 124 of a tenant B from a channel 140. The method includes step S51 to step S61.

Step S51: A management node 170 sends a request for removing the tenant B from the channel 140 to each tenant other than the tenant B. The request includes an identifier of the tenant B and an identifier of the channel 140.

All the tenants other than the tenant B are all tenants other than the tenant B corresponding to the blockchain node groups that have joined the channel 140.

Optionally, a scenario in which the management node 170 is triggered to send the request for removing the tenant B from the channel 140 is not limited in this application. The following provides an example of a scenario.

For example, a malicious virus exists in a resource isolation region 120 of the tenant B. As a result, the blockchain node group 124 cannot perform a transaction on a contract matter in the channel 140. For example, a container deployed in the resource isolation region 120 runs malicious virus code. For example, the blockchain node group 124 deployed in the resource isolation region 120 is maliciously modified or has been intruded by the malicious virus. As a result, a certificate used to sign a transaction record in the blockchain node group 124 is tampered with, or a port used by the blockchain node group 124 to receive a transaction request from a client is maliciously disabled.

In a possible attack mode, the container runs the malicious virus. The malicious virus obtains a cap_dac_override capability by using an application, and then triggers an open_by_handle_at system call. The malicious virus traverses all file paths by using the system call, violently cracks a handle file handle of each file in each file path, accesses the file by using the handle file handle, and steals/destroys data in the file.

Optionally, the management node 170 may directly generate the request for removing the tenant B from the channel 140 without any condition to trigger an action of generating the request.

Step S52: The management node 170 receives feedback on the request from all the tenants other than the tenant B, and reaches a consensus on all the feedback according to a consensus policy.

Optionally, the consensus policy may be a policy that the minority subordinate to the majority. Therefore, if most tenants feedback that they agree to remove the tenant B from the channel 140, a consensus on removing the tenant B from the channel 140 is reached.

Optionally, for reaching the consensus on removing the tenant B from the channel 140, the consensus policy may specify a tenant that needs to obtain consent. For example, a blockchain node group 114 of a tenant A, the blockchain node group 124 of the tenant B, and a blockchain node group 124 of a tenant C have all joined the channel 140. The consensus policy may specify that the consensus on removing the tenant B from the channel 140 can be reached only after consent of both the tenant A and the tenant C is obtained. For example, if the tenant A is an initiator of the channel 140, the consensus policy may specify that the consensus on removing the tenant B from the channel 140 can be reached only with consent of the tenant A.

After the consensus on removing the tenant B from the channel 140 is reached, the management node 170 performs step S53 to stop the blockchain node group 124 of the tenant B from participating in the channel 140 (i.e., to prevent the blockchain node group 124 from continuing to participate in blockchain maintenance of the channel 140).

In this application, a specific implementation in which a tenant joins the channel 140 is as follows: at least one of a plurality of blockchain node groups of the tenant joins the channel 140. That the tenant exits the channel 140 means that all blockchain node groups that are of the tenant and that have joined the channel 140 exit the channel 140.

Optionally, the management node 170 may perform an action of stopping the blockchain node group 124 in step S53 without first obtaining a consensus of a tenant. Therefore, step S51 and step S52 are optional steps in this application.

Step S53: The management node 170 instructs an execution node 1201 of the tenant B to stop running the blockchain node group 124.

The execution node 1201 of the tenant B is deployed in the resource isolation region 120. Optionally, the execution node 1201 of the tenant B may be deployed on one server in the resource isolation region 120, or may be deployed on a plurality of servers in the resource isolation region 120 in a distributed manner.

A communication connection is established between the management node 170 and the execution node 1201 of the tenant B. In this way, data transmission may be performed between the management node 170 and the execution node 1201 of the tenant B. In step S53, the management node 170 may instruct the execution node 1201 of the tenant B through a message or an instruction in an implementation. A specific implementation of instructing is not limited herein. The message or the instruction may carry an identifier of the blockchain node group 124.

Step S54: The execution node 1201 of the tenant B stops running the blockchain node group 124 in the resource isolation region 120 of the tenant B.

Specifically, the execution node 1201 of the tenant B may perform the following two operations to stop the blockchain node group 124.

An operation 1: The execution node 1201 of the tenant B may instruct an anchor peer 121 to disconnect a communication connection from an anchor peer (e.g., an anchor peer 111 of the blockchain node group 114 of the tenant A) of another blockchain node group in the channel 140. Subsequently, a blockchain node 122 in the blockchain node group 124 no longer exchanges data with the other blockchain node group in the channel 140.

An operation 2: The execution node 1201 of the tenant B instructs a leading peer 123 to disconnect a communication connection from a consensus node 163. In this way, the leading peer 123 no longer obtains, from the consensus node 163, a new block of the channel 140.

Optionally, when the execution node 1201 of the tenant B stops the blockchain node group 124, the execution node 1201 of the tenant B also stops a communication connection between the anchor peer 121, the leading peer 123, and the blockchain node 122 in the blockchain node group 124. In this way, data transmission cannot continue between the anchor peer 121, the leading peer 123, and the blockchain node 122.

Step S55: The management node 170 obtains configuration information of the blockchain node group 124.

The management node 170 stores the configuration information of the blockchain node group 124 in the channel 140. Therefore, the management node 170 may obtain the configuration information of the blockchain node group 124.

Optionally, the management node 170 stores channel configuration information of the channel 140, and the channel configuration information records configuration information of all the blockchain node groups in the channel 140. Therefore, the management node 170 may obtain the configuration information of the blockchain node group 124 in the channel 140.

Step S56: The management node 170 sends, to an execution node 1101 of the tenant A, an indication for removing the blockchain node group 124 from the channel 140. The indication carries the identifier of the channel 140 and the identifier of the blockchain node group 124, and further carries the configuration information of the blockchain node group 124.

A communication connection is established between the management node 170 and the execution node 1101 of the tenant A. In this way, data transmission may be performed between the management node 170 and the execution node 1101 of the tenant A. In step S56, the management node 170 may instruct the execution node 1101 of the tenant A through a message or an instruction in an implementation. A specific implementation of instructing is not limited herein. The message or the instruction may carry the identifier of the blockchain node group 124.

Step S57: The execution node 1101 of the tenant A obtains the channel configuration information of the channel 140.

The channel configuration information of the channel 140 may include the identifier of the channel 140 and the configuration information of all the blockchain node groups included in the channel 140. In this case, the channel configuration information includes the configuration information of the blockchain node group 124.

Optionally, the configuration information of each blockchain node group includes an operation permission of the blockchain node group, a permission certificate of the blockchain node group, and a security algorithm used by the blockchain node group.

The operation permission of the blockchain node group includes a highest management permission of the blockchain node group, and a read permission and a write permission for operating data in the blockchain node group. In an implementation, the channel configuration information is used to instruct to configure a highest management permission of the blockchain node group 124 for the blockchain node group 124. The channel configuration information is used to instruct to configure, for the blockchain node group 124, a read permission and a write permission for reading/writing data in the blockchain node group 124. In this way, the blockchain node group 124 may read/write a blockchain managed by the blockchain group 124.

Optionally, the permission certificate of the blockchain node group includes a certificate for managing the highest management permission of the blockchain node group, a root certificate of the blockchain node group, and a root certificate used for communication of the blockchain node group. Optionally, the root certificate of the blockchain node group is a permission certificate used by the client to access the blockchain node group. Optionally, the root certificate used for communication of the blockchain node group may be used to: establish a communication connection between an anchor peer, an internal blockchain node, and a leading peer in the blockchain node group, establish a communication connection between the anchor node in the blockchain node group and an anchor peer in another blockchain node group in the channel 140, and establish a communication connection between the leading peer in the blockchain node group and a consensus node. Optionally, the communication connection established based on the root certificate used for communication of the blockchain node group is a communication connection that needs to be authenticated by using the root certificate. Optionally, the root certificate used for communication of the blockchain node group may be a root certificate used for communication based on a transport layer security (TLS) protocol.

The security algorithm used by the blockchain node group includes an algorithm (e.g., a Hash algorithm) for preventing a block from being tampered with. For example, for two adjacent blocks in a blockchain, a Hash value of a previous block is calculated by using the Hash algorithm, and the Hash value is stored in a next block. In this way, whether data of the previous block is maliciously modified may be found by using the Hash value. Optionally, if the blockchain node group further participates in endorsement, the security algorithm used by the blockchain node group further includes an algorithm (e.g., the Hash algorithm) for preventing a transaction record endorsed by the blockchain node group from being tampered with. Therefore, the consensus node receives, from the blockchain node group, a transaction record processed according to the algorithm, to prevent transaction information in the transaction record from being leaked on the consensus node.

Optionally, the channel configuration information in this application may further include a permission policy of the channel 140.

The permission policy of the channel 140 specifies a tenant who a management permission in the channel 140. For example, the permission policy specifies a tenant who has the highest management permission in the channel 140. For example, the permission policy may specify a tenant that has the read permission to read the channel configuration information in the channel 140. For example, the permission policy specifies a tenant that has the write permission to write the channel configuration information in the channel 140. Optionally, if the tenant A is the initiator that creates the channel 140, the permission policy of the channel 140 may specify that the tenant A has the highest management permission to manage the channel 140, may specify that the tenant A has the read permission to read the channel configuration information, and may specify that the tenant A has the write permission to write the channel configuration information.

Optionally, the channel configuration information in this application may further include a version number of the channel configuration information.

In step S57, the execution node 1101 of the tenant A may obtain the channel configuration information of the channel 140 from a consensus organization 160 (e.g., the consensus node 161), where the channel configuration information includes the configuration information of the blockchain node group 124.

Step S58: The execution node of the tenant A generates channel adjustment information of the channel 140.

The execution node 1101 of the tenant A may calculate a difference between the channel configuration information of the channel 140 and the configuration information that is of the blockchain node group 124 and that is obtained by the management node 170, and record the difference in the channel adjustment information. Therefore, the channel adjustment information includes the difference between the channel configuration information and the configuration information of the blockchain node group 124. In other words, the channel adjustment information does not include the configuration information of the blockchain node group 124. In addition, the channel adjustment information includes the configuration information of all the blockchain node groups other than the blockchain node group 124 of the tenant B in the channel 140. The channel adjustment information may further include the identifier of the channel 140. Optionally, the channel adjustment information may further include a version number of the channel adjustment information and the version number of the channel configuration information.

In an implementation, a data structure is provided to record the channel configuration information. The data structure includes the following fields: a field recording the identifier of the channel 140, a field recording the configuration information of all the blockchain node groups included in the channel 140, a field recording the permission policy of the channel 140, and a field recording the version number. The channel adjustment information includes the difference between the channel configuration information and the configuration information of the blockchain node group 124. In this application, the channel adjustment information is recorded still by using the data structure. The configuration information that is of the blockchain node group 124 and that is included in the channel configuration information obtained from the consensus organization 160 is the same as the configuration information that is of the blockchain node group 124 and that is sent by the management node 170 to the execution node 1101 of the tenant A. Therefore, in the data structure recording the channel adjustment information, a field recording the configuration information of the blockchain node group 124 is empty. To be specific, the configuration information of all the blockchain node groups other than the blockchain node group 124 of the tenant B in the channel 140 is recorded in the data structure recording the channel adjustment information. The version number of the channel adjustment information is recorded in the data structure recording the channel adjustment information, and the version number that is of the channel configuration information of the channel 140 and that is obtained from the consensus organization 160 may be further recorded. The identifier of the channel 140 is recorded in the data structure recording the channel adjustment information.

Step S59: The execution node 1101 of the tenant A sends the channel adjustment information to the consensus organization 160.

Specifically, the execution node 1101 of the tenant A sends the channel adjustment information to the consensus node 161 connected to the blockchain node group 114.

In this application, the channel adjustment information is used as a transaction record because the channel adjustment information needs to be recorded in a blockchain corresponding to the channel 140. To be specific, a consensus of all the tenants, other than the tenant B, in the tenants that have joined the channel 140 is recorded in the blockchain. Specifically, the execution node 1101 of the tenant A sends the channel adjustment information to a leading peer 113, and the leading peer 113 sends the channel adjustment information to the consensus node 161.

The consensus node 161 receives the channel adjustment information, and uses the channel adjustment information as a transaction record. According to a transaction record processing manner, the consensus organization 160 verifies the channel adjustment information according to a consensus algorithm of the channel 140, and the consensus node 161 stores the verified channel adjustment information.

The consensus node 161 generates a block including the channel adjustment information. In a possible implementation, if a data amount of the channel adjustment information reaches a data amount for generating one block, the consensus node 161 generates a block recording only the channel adjustment information. In a possible implementation, if a data amount of the channel adjustment information does not reach a data amount for generating one block, the consensus node 161 generates a block by using the channel adjustment information and another transaction record of the channel 140. In another possible implementation, if a data amount of the channel adjustment information exceeds a data amount for generating one block, and the consensus node 161 divides the channel adjustment information into a plurality of blocks. Optionally, when the plurality of blocks are generated, the channel adjustment information is first divided into a plurality of pieces of data based on data amounts required for generating the blocks, and other pieces of data are equal to data amounts required for generating other blocks. Therefore, the last piece of data and other transaction records of the channel 140 are used to generate one block, and one block is generated for each of the other pieces of data.

Another consensus node of the consensus organization 160 synchronizes the block that is generated by the consensus node 161 and that includes the channel adjustment information. For example, the consensus node 161 sends a copy of the block to a consensus node 164, and the consensus node 164 stores the block.

In the channel 140, other than the blockchain node group 124 of the tenant B, each blockchain node group that has joined the channel 140 may obtain, from a consensus node connected to the blockchain node group, the block including the channel adjustment information, and adds the block to a blockchain stored in the blockchain node group. Therefore, each of all the other blockchain node groups that have joined the channel 140 may reach the consensus on exiting the blockchain node group 124 from the channel 140 by using the blockchain.

For example, other than the blockchain node group 124 of the tenant B, the channel 140 further includes the blockchain node group 114 of the tenant A and the blockchain node group 134 of the tenant C. The leading peer 113 of the blockchain node group 114 of the tenant A may obtain, from the consensus node 161, the block including the channel adjustment information, and add the block to a blockchain stored in the blockchain node group 114. A leading peer 133 of the blockchain node group 134 may obtain the block including the channel adjustment information from the consensus node 164, and add the block to a blockchain stored in the blockchain node group 134. In this way, the blockchain node group 114 of the tenant A and the blockchain node group 134 of the tenant C record, in the respective blockchains, the consensus on exiting the blockchain node group 124 from the channel 140. In other words, the tenant A and the tenant C record the consensus on exiting the blockchain node group 124 from the channel 140.

In this application, step S53 and step S54 may be performed before step S55 to step S59, or may be performed simultaneously with step S55 to step S59, or may be performed after step S55 to step S59.

Step S60: The management node 170 sends an indication for updating an endorsement policy to the execution node 1101 of the tenant A.

After the blockchain node group 124 of the tenant B exits the channel 140, if there is a contract matter that requires the blockchain node group 124 and the blockchain node group 114 to jointly participate in endorsement, an endorsement policy corresponding to the contract matter needs to be updated. The management node 170 performs step S60 to send an indication for updating the endorsement policy to the execution node 1101 of the tenant A.

After the blockchain node group 124 exits the channel 140, if there is no contract matter that requires the blockchain node 122 to participate in endorsement, the endorsement policy does not need to be updated. Therefore, both step S60 and step S61 are optional steps of this method.

In this application, step S60 is an optional step. Updating, by an execution node of a tenant, an endorsement policy may be triggered by the management node 170, or may be triggered by the execution node of the tenant.

Step S61: The execution node 1101 of the tenant A updates the endorsement policy.

Specifically, after the blockchain node group 124 exits the channel 140, if there is the contract matter that requires the blockchain node group 124 and the blockchain node group 114 to jointly participate in endorsement, the execution node 1101 of the tenant A updates a chaincode used to execute the contract matter, including updating the endorsement policy recorded in the chaincode. An updated endorsement policy specifies a blockchain node group (e.g., including the blockchain node group 114, but excluding the blockchain node group 124) that needs to participate in endorsement. The blockchain node group 114 (which may be specifically the internal blockchain node 112) reloads an updated chaincode. In this way, the blockchain node group 124 subsequently does not participate in endorsement of a transaction record obtained by executing the contract matter.

If there is the contract matter that requires the blockchain node group 124 and the blockchain node group 134 to jointly participate in endorsement, the blockchain node group 134 may update the endorsement policy in a manner similar to that of the blockchain node group 114. Therefore, in the channel 140, a blockchain node group of another tenant other than the blockchain node group 124 of the tenant B may update the endorsement policy in an update manner similar to that of updating the endorsement policy by the blockchain node group 114. Optionally, the blockchain node group of the another tenant other than the blockchain node group 124 of the tenant B may be triggered by the indication sent by the management node 170 to update the endorsement policy.

Optionally, the chaincode used to execute the contract matter is manually updated, and the execution node of the tenant is replaced with the chaincode used to execute the contract matter.

This application provides a blockchain maintenance apparatus. The apparatus may be an execution node (namely, the execution node 1101 of the tenant A) of a second tenant (namely, the tenant A) described in this application. Functional units included in the apparatus is configured to implement the steps performed by the execution node of the second tenant in the blockchain maintenance method. How to divide the functional units in the apparatus is not limited in this application. The following provides an example of division into the functional units, as shown in FIG. 6.

Figure 6:
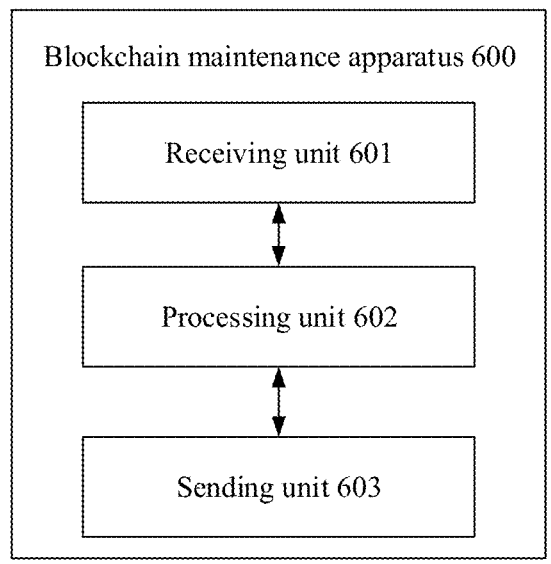
FIG. 6 is a schematic diagram of a logical structure of a blockchain maintenance apparatus 600 according to this application.

The blockchain maintenance apparatus 600 shown in FIG. 6 includes:
 a receiving unit 601, configured to receive configuration information that is of a target blockchain node group (namely, a blockchain node group 124) of a first tenant (namely, a tenant B) and that is sent by a management node;
 a processing unit 602, configured to obtain channel configuration information of a channel from a consensus organization (namely, a consensus organization 160), where the channel (namely, a channel 140) corresponds to one blockchain, the channel configuration information includes an identifier of the channel and configuration information of all blockchain node groups that have joined the channel, and all the blockchain node groups that have joined the channel include the target blockchain node group; where
 the processing unit 602 is configured to generate channel adjustment information of the channel based on the channel configuration information and the configuration information that is of the target blockchain node group and that is received from the management node, where the channel adjustment information includes the identifier of the channel and configuration information of a blockchain node group other than the target blockchain node group in all the blockchain node groups that have joined the channel; and
 a sending unit 603, configured to send the channel adjustment information to the consensus organization; where
 the processing unit 602 is further configured to: obtain, from the consensus organization, a block including the channel adjustment information, and add the block to a blockchain stored in a blockchain node group that has joined the channel.

Optionally, the configuration information of the target blockchain node group includes:
 an operation permission of the target blockchain node group;
 a permission certificate of the target blockchain node group; and
 a security algorithm used by the target blockchain node group.

Optionally, the processing unit 602 is configured to: for a contract matter that requires the target blockchain node group to participate in endorsement, update, in a chaincode used to execute the contract matter, an endorsement policy corresponding to the contract matter, where an updated endorsement policy specifies that the target blockchain node group does not participate in endorsement of a transaction record obtained by executing the contract matter.

This application provides a blockchain maintenance apparatus. The apparatus may be an execution node (namely, the execution node 1201 of the tenant B) of a first tenant (namely, the tenant B) described in this application. Functional units included in the apparatus is configured to implement the steps performed by the execution node of the first tenant in the blockchain maintenance method. How to divide the functional units in the apparatus is not limited in this application. The following provides an example of division into the functional units, as shown in FIG. 7.

Figure 7:
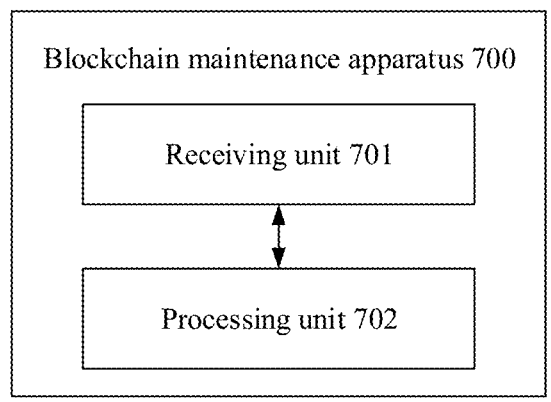
FIG. 7 is a schematic diagram of a logical structure of a blockchain maintenance apparatus 700 according to this application.

The blockchain maintenance apparatus 700 shown in FIG. 7 includes:

- a receiving unit 701, configured to receive an indication that is sent by a management node (namely, a management node 170) and that is for stopping running a target blockchain node group (namely, a blockchain node group 124) that has joined a channel (namely, a channel 140), where the channel corresponds to one blockchain; and
- a processing unit 702, configured to stop running the target blockchain node group in a resource isolation region (namely, a resource isolation region 120) of a first tenant (namely, a tenant B).

This application provides a blockchain maintenance apparatus. The apparatus may be the management node (namely, the management node 170) described in this application. Functional units included in the apparatus is configured to implement the steps performed by the management node in the blockchain maintenance method. How to divide the functional units in the apparatus is not limited in this application. The following provides an example of division into the functional units, as shown in FIG. 8.

Figure 8:
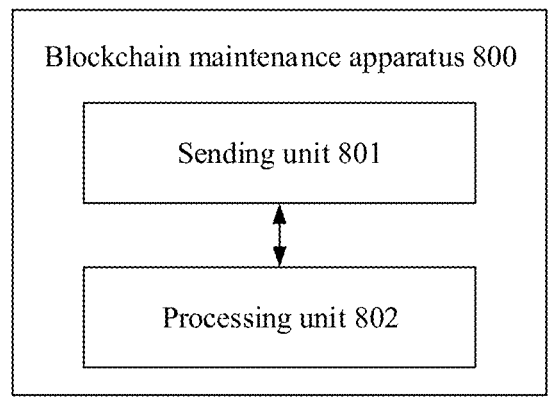
FIG. 8 is a schematic diagram of a logical structure of a blockchain maintenance apparatus 800 according to this application.

The blockchain maintenance apparatus 800 shown in FIG. 8 includes:

- a processing unit 802, configured to instruct an execution node (namely, an execution node 1201) of a first tenant (namely, a tenant B) to stop running, in a resource isolation region (namely, a resource isolation region 120) of the first tenant, a target blockchain node group (a blockchain node group 124) that has joined a channel (namely, a channel 140), where the channel corresponds to one blockchain; where
  the processing unit 802 is configured to obtain configuration information of the target blockchain node group; and
- a sending unit 801, configured to send the configuration information of the target blockchain node group to an execution node (namely, an execution node 1101) of a second tenant (namely, a tenant A).

Optionally, the configuration information of the target blockchain node group includes:

- an operation permission of the target blockchain node group;
- a permission certificate of the target blockchain node group; and
- a security algorithm used by the target blockchain node group.

Optionally, the sending unit 801 is configured to send, to a tenant other than the first tenant in all tenants that have joined the channel, a request for removing the first tenant from the channel.

The processing unit 802 is configured to: receive feedback on the request from the tenants, other than the first tenant, in all the tenants that have joined the channel, and reach, according to a consensus policy, a consensus on removing the first tenant from the channel for all feedback.

Optionally, the processing unit 802 is configured to: when a virus exists in the resource isolation region of the first tenant, generate the request for removing the first tenant from the channel.

Optionally, the processing unit 802 is configured to: for a contract matter that requires the target blockchain node group to participate in endorsement, instruct the execution node of the first tenant to update an endorsement policy corresponding to the contract matter, where an updated endorsement policy specifies that the target blockchain node group does not participate in endorsement of a transaction record obtained by executing the contract matter.

An execution node (e.g., the execution node of the first tenant or the execution node of the second tenant) or a management node of a tenant may be deployed on one server, or may be deployed on a plurality of servers in a distributed manner. The execution node or the management node of the tenant may be deployed on a same server or different servers. The following provides an example of a possible basic hardware architecture of the server, as shown in FIG. 9.

Figure 9:
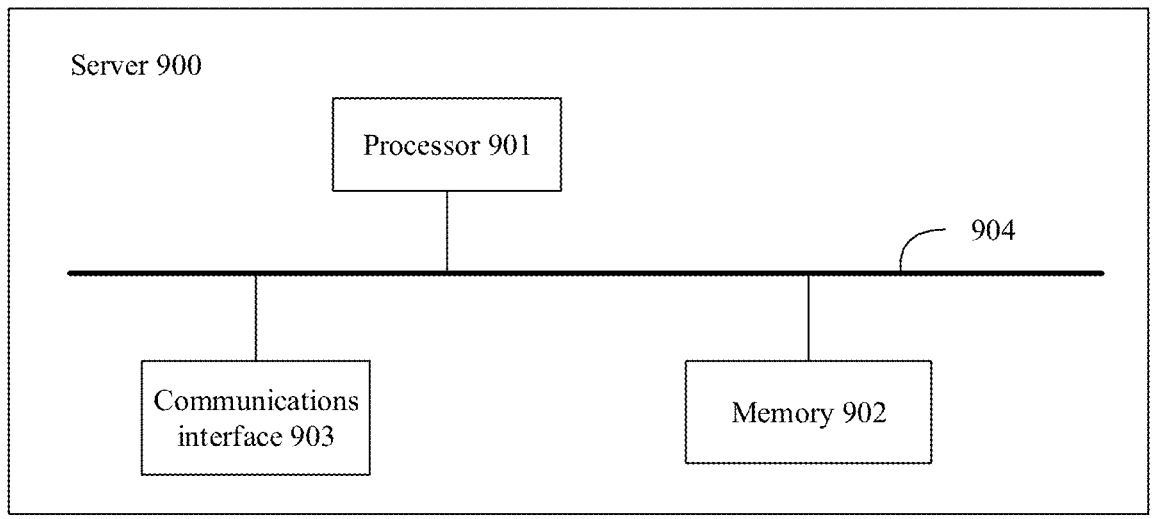
FIG. 9 is a schematic diagram of a hardware structure of a server 900 according to this application.

Referring to FIG. 9, the server 900 includes a processor 901, a memory 902, a communications interface 903, and a bus 904.

In the server 900, there may be one or more processors 901. FIG. 1 shows only one of the processors 901. Optionally, the processor 901 may be a central processing unit (CPU) or an ARM processor. If the server 900 includes a plurality of processors 901, the plurality of processors 901 may be of a same type or different types. Optionally, the plurality of processors 901 in the server 900 may be integrated into a multi-core processor.

The memory 902 stores a computer instruction. For example, the computer instruction includes a chaincode. For example, the computer instruction is used to implement the steps in the method provided in this application. For example, the computer instruction is used to implement the functional units included in the apparatus 600, the apparatus 700, or the apparatus 800 provided in this application.

The memory 902 may be any one or any combination of the following storage media: a non-volatile memory (e.g., a read-only memory (ROM), a solid-state drive (SSD), a hard disk drive, a magnetic disk, or a magnetic disk array), and a volatile memory).

The communications interface 903 may be any one or any combination of the following components with a network access function, such as a network interface (e.g., an Ethernet interface) and a wireless network interface card.

The communications interface 903 is configured to perform data communication between the server 900 and another device (e.g., a server).

A thick line is used to represent the bus 904 in FIG. 9. The processor 901, the memory 902, and the communications interface 903 are connected by using the bus 904. In this way, the processor 901 may access the memory 902 by using the bus 904, and exchange data with the another device (e.g., the server) through the communications interface 903 by using the bus 904.

Optionally, the server 900 executes the computer instruction in the memory 902, to implement, on the server 900, the steps performed by an execution node or the steps performed by a management node in the blockchain maintenance method provided in this application, or implement, on the server 900, the apparatus 600, the apparatus 700, or the apparatus 800 provided in this application.

This application provides a computer-readable storage medium. The computer-readable storage medium stores a computer instruction. When a processor 901 of a server 900 executes the computer instruction, the server 900 performs the steps performed by an execution node of a first tenant in the blockchain maintenance method provided in this application, performs the steps performed by an execution node of a second tenant in the method, or performs the steps performed by a management node in the method.

This application provides a computer-readable storage medium. The computer-readable storage medium stores a computer instruction, and the computer instruction is used to implement the apparatus 600, the apparatus 700, or the apparatus 800.

This application provides a computer program product. The computer program product includes a computer instruction, and the computer instruction is stored in a computer-readable storage medium. A processor of a server may read the computer instruction from the computer-readable storage medium and execute the computer instruction, so that the server performs the steps performed by an execution node of a first tenant in the blockchain maintenance method provided in this application, performs the steps performed by an execution node of a second tenant in the method, or performs the steps performed by a management node in the method.

This application provides a computer program product. A computer instruction included in the computer program product is used to implement the apparatus 600, the apparatus 700, or the apparatus 800.

The foregoing embodiments are merely intended for describing the technical solutions of the present application, but not for limiting the present application. Although the present application is described in detail with reference to the foregoing embodiments, persons of ordinary skill in the art should understand that they may still make modifications to the technical solutions described in the foregoing embodiments or make equivalent replacements to some technical features thereof, without departing from the protection scope of the technical solutions of the embodiments of the present application.

What is claimed is:

1. A blockchain maintenance method, wherein the method comprises:
   receiving configuration information that is of a target blockchain node group of a first tenant and that is sent by a management node;
   obtaining channel configuration information of a channel from a consensus organization, wherein the channel corresponds to a blockchain, the channel configuration information comprises an identifier of the channel and configuration information of one or more blockchain node groups that have joined the channel;
   generating channel adjustment information of the channel based on the channel configuration information and the configuration information that is of the target blockchain node group and that is received from the management node, wherein the channel adjustment information comprises the identifier of the channel and configuration information of a blockchain node group other than the target blockchain node group in the one or more blockchain node groups that have joined the channel;
   sending the channel adjustment information to the consensus organization;
   obtaining, from the consensus organization, a block comprising the channel adjustment information; and
   adding the block to a blockchain stored in a blockchain node group that has joined the channel.

2. The method according to claim 1, wherein the configuration information of the target blockchain node group comprises:
   an operation permission of the target blockchain node group;
   a permission certificate of the target blockchain node group; and
   a security algorithm used by the target blockchain node group.

3. The method according to claim 1, wherein the method comprises:
   for a contract matter that requires the target blockchain node group to participate in endorsement, updating, in a chaincode used to execute the contract matter, an endorsement policy corresponding to the contract matter, wherein an updated endorsement policy specifies that the target blockchain node group does not participate in endorsement of a transaction record obtained by executing the contract matter.

4. A blockchain maintenance method, wherein the method comprises:
   instructing an execution node of a first tenant to stop running, in a resource isolation region of the first tenant, a target blockchain node group that has joined a channel, wherein the channel corresponds to a blockchain; and
   obtaining configuration information of the target blockchain node group, and sending the configuration information of the target blockchain node group to an execution node of a second tenant.

5. The method according to claim 4, wherein the configuration information of the target blockchain node group comprises:
   an operation permission of the target blockchain node group;
   a permission certificate of the target blockchain node group; and
   a security algorithm used by the target blockchain node group.

6. The method according to claim 4, wherein the method comprises:
   sending a request for removing the first tenant from the channel to a tenant other than the first tenant in one or more tenants that have joined the channel;
   receiving feedback on the request from the one or more tenants other than the first tenant that have joined the channel; and
   reaching, according to a consensus policy, a consensus on removing the first tenant from the channel for the feedback.

7. The method according to claim 6, wherein the method comprises:
   responsive to determining a virus exists in the resource isolation region of the first tenant, generating the request for removing the first tenant from the channel.

8. The method according to claim 4, wherein the method comprises:
   for a contract matter that requires the target blockchain node group to participate in endorsement, instructing the execution node of the first tenant to update an endorsement policy corresponding to the contract matter, wherein an updated endorsement policy specifies that the target blockchain node group does not participate in endorsement of a transaction record obtained by executing the contract matter.

9. A server, comprising a processor and a memory, wherein the memory is configured to store a computer instruction; and the processor is configured to execute the computer instruction stored in the memory, so that the server is configured to:

receive configuration information that is of a target blockchain node group of a first tenant and that is sent by a management node;

obtain channel configuration information of a channel from a consensus organization, wherein the channel corresponds to a blockchain, the channel configuration information comprises an identifier of the channel and configuration information of one or more blockchain node groups that have joined the channel;

generate channel adjustment information of the channel based on the channel configuration information and the configuration information that is of the target blockchain node group and that is received from the management node, wherein the channel adjustment information comprises the identifier of the channel and configuration information of a blockchain node group other than the target blockchain node group in the one or more blockchain node groups that have joined the channel;

send the channel adjustment information to the consensus organization; and obtain, from the consensus organization, a block comprising the channel adjustment information, and add the block to a blockchain stored in a blockchain node group that has joined the channel.

10. The server according to claim 9, wherein the configuration information of the target blockchain node group comprises:

an operation permission of the target blockchain node group.

11. The server according to claim 9, wherein the configuration information of the target blockchain node group comprises:

a permission certificate of the target blockchain node group.

12. The server according to claim 9, wherein the configuration information of the target blockchain node group comprises:

a security algorithm used by the target blockchain node group.

13. The server according to claim 9, wherein the server is configured to:

for a contract matter that requires the target blockchain node group to participate in endorsement, update, in a chaincode used to execute the contract matter, an endorsement policy corresponding to the contract matter, wherein an updated endorsement policy specifies that the target blockchain node group does not participate in endorsement of a transaction record obtained by executing the contract matter.

14. A server, comprising a processor and a memory, wherein the memory is configured to store a computer instruction; and the processor is configured to execute the computer instruction stored in the memory, so that the server is configured to: instruct an execution node of a first tenant to stop running, in a resource isolation region of the first tenant, a target blockchain node group that has joined a channel, wherein the channel corresponds to a blockchain;

obtain configuration information of the target blockchain node group; and send the configuration information of the target blockchain node group to an execution node of a second tenant.

15. The server according to claim 14, wherein the configuration information of the target blockchain node group comprises:

an operation permission of the target blockchain node group.

16. The server according to claim 14, wherein the configuration information of the target blockchain node group comprises:

a permission certificate of the target blockchain node group.

17. The server according to claim 15, wherein the configuration information of the target blockchain node group comprises:

a security algorithm used by the target blockchain node group.

18. The server according to claim 14, wherein the server is configured to: send, to a tenant other than the first tenant in one or more tenants that have joined the channel, a request for removing the first tenant from the channel; and receive feedback on the request from the one or more tenants other than the first tenant that have joined the channel, and reach, according to a consensus policy, a consensus on removing the first tenant from the channel for the feedback.

19. The server according to claim 18, wherein the server is configured to: responsive to determining a virus exists in the resource isolation region of the first tenant, generate the request for exiting the first tenant from the channel.

20. The server according to claim 14, wherein the server is configured to: for a contract matter that requires the target blockchain node group to participate in endorsement, instruct the execution node of the first tenant to update an endorsement policy corresponding to the contract matter, wherein an updated endorsement policy specifies that the target blockchain node group does not participate in endorsement of a transaction record obtained by executing the contract matter.

* * * * *